(12) United States Patent
Houde-Walter et al.

(10) Patent No.: US 9,219,568 B2
(45) Date of Patent: Dec. 22, 2015

(54) SYSTEMS AND METHODS FOR INTERACTION WITH THERMAL DETECTORS

(71) Applicant: LaserMax, Inc., Rochester, NY (US)

(72) Inventors: Susan Houde-Walter, Rush, NY (US); Christopher Gagliano, Rochester, NY (US)

(73) Assignee: LaserMax, Inc., Rochester, NY (US)

( * ) Notice: Subject to any disclaimer, the term of this patent is extended or adjusted under 35 U.S.C. 154(b) by 0 days.

(21) Appl. No.: 14/209,522

(22) Filed: Mar. 13, 2014

(65) Prior Publication Data

US 2015/0338280 A1 Nov. 26, 2015

Related U.S. Application Data

(60) Provisional application No. 61/790,962, filed on Mar. 15, 2013.

(51) Int. Cl.
*H04K 3/00* (2006.01)
*G01J 5/08* (2006.01)

(52) U.S. Cl.
CPC ... *H04K 3/62* (2013.01); *G01J 5/08* (2013.01); *H04K 3/60* (2013.01)

(58) Field of Classification Search
CPC .................................. H04K 3/62; H04K 3/60
See application file for complete search history.

(56) References Cited

U.S. PATENT DOCUMENTS

| | | | |
|---|---|---|---|
| 2003/0005030 A1* | 1/2003 | Sutton et al. | 709/200 |
| 2005/0224706 A1* | 10/2005 | von Rosenberg, Jr. | 250/234 |
| 2012/0256088 A1* | 10/2012 | Balonek et al. | 250/330 |

* cited by examiner

*Primary Examiner* — David Porta
*Assistant Examiner* — Hugh H Maupin
(74) *Attorney, Agent, or Firm* — Dominic Ciminello; Lee & Hayes, LLC.; Roland R. Schindler, II

(57) ABSTRACT

A system for interacting with a thermal detector includes at least one unmanned aerial vehicle and a sensor mounted to the at least one unmanned aerial vehicle. The sensor is configured to determine the presence of a component of the thermal detector and to generate a signal indicative of the presence of the component. The system also includes a beam emitter mounted to the at least one unmanned vehicle and in communication with the sensor. The beam emitter includes a beam source configured to direct a beam of thermal radiation to the thermal detector in response to the signal from the sensor.

15 Claims, 5 Drawing Sheets

SYSTEMS AND METHODS FOR INTERACTION WITH THERMAL DETECTORS

CROSS-REFERENCE TO RELATED APPLICATIONS

This application claims the benefit of U.S. Provisional Patent Application No. 61/790,962, filed Mar. 15, 2013, the entire disclosure of which is incorporated herein by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present disclosure relates to thermal detectors and, in particular, to systems and methods of interacting with thermal detectors.

2. Description of Related Art

Until recently, friendly reconnaissance groups, rescue groups, law enforcement groups, security groups, combat personnel, and other friendly forces were the only users of conventional night vision goggles, viewing devices, or other like thermal detectors. However, such thermal detectors are now becoming more widely used by unfriendly or foe opposition groups. For example, such unfriendly groups are finding it increasingly easy to equip troops, trucks, tanks, and/or other mobile vehicles with such thermal detectors. Such groups have also begun mounting such thermal detectors to stationary objects such as masts, posts, fences, and buildings. With such thermal detectors in place, it is relatively easy for these unfriendly groups to detect (i.e., see) friendly forces as they approach. For example, such thermal detectors may enable unfriendly forces to sense thermal radiation emitted by friendly forces as the friendly forces pass into a detection range of the thermal detectors. Such detection may put friendly forces at risk during combat, law enforcement, security, reconnaissance, and/or other like operations.

The various embodiments set forth in the present disclosure are directed toward overcoming the problems discussed above.

BRIEF SUMMARY OF THE INVENTION

In an exemplary embodiment of the present disclosure, a system for interacting with a thermal detector includes at least one unmanned aerial vehicle and a sensor mounted to the at least one unmanned aerial vehicle. The sensor is configured to determine the presence of a component of the thermal detector and to generate a signal indicative of the presence of the component. The system also includes a beam emitter mounted to the at least one unmanned vehicle and in communication with the sensor. The beam emitter includes a beam source configured to direct a beam of thermal radiation to the thermal detector in response to the signal from the sensor.

In another exemplary embodiment of the present disclosure, a system for interacting with a thermal detector includes a plurality of unmanned aerial vehicles. Each vehicle of the plurality of unmanned aerial vehicles includes a beam emitter having a quantum cascade laser, and a sensor configured to determine the presence of a component of the thermal detector and to generate a signal indicative of the presence of the component. The plurality of unmanned aerial vehicles is configured to move, in concert, relative to the thermal detector. Each quantum cascade laser is configured to impinge a respective beam of thermal radiation upon a focal plane array of the thermal detector in response to the signal, thereby rendering a portion of the focal plane array inoperable. The system also includes a remote source in communication with the plurality of unmanned aerial vehicles.

In a further exemplary embodiment of the present disclosure, a method of interacting with a thermal detector includes determining the presence of the thermal detector by detecting a wavefront of radiation reflected by a lens of the thermal detector and moving at least one unmanned aerial vehicle from a first location outside of a detection range of the thermal detector to a location within the detection range of the thermal detector. The method also includes impinging a beam of thermal radiation onto a component of the thermal detector with a beam source carried by the at least one unmanned aerial vehicle. Impinging the beam onto the component renders the component inoperable.

BRIEF DESCRIPTION OF THE SEVERAL VIEWS OF THE DRAWING(S)

DETAILED DESCRIPTION OF THE INVENTION

Figure 1:
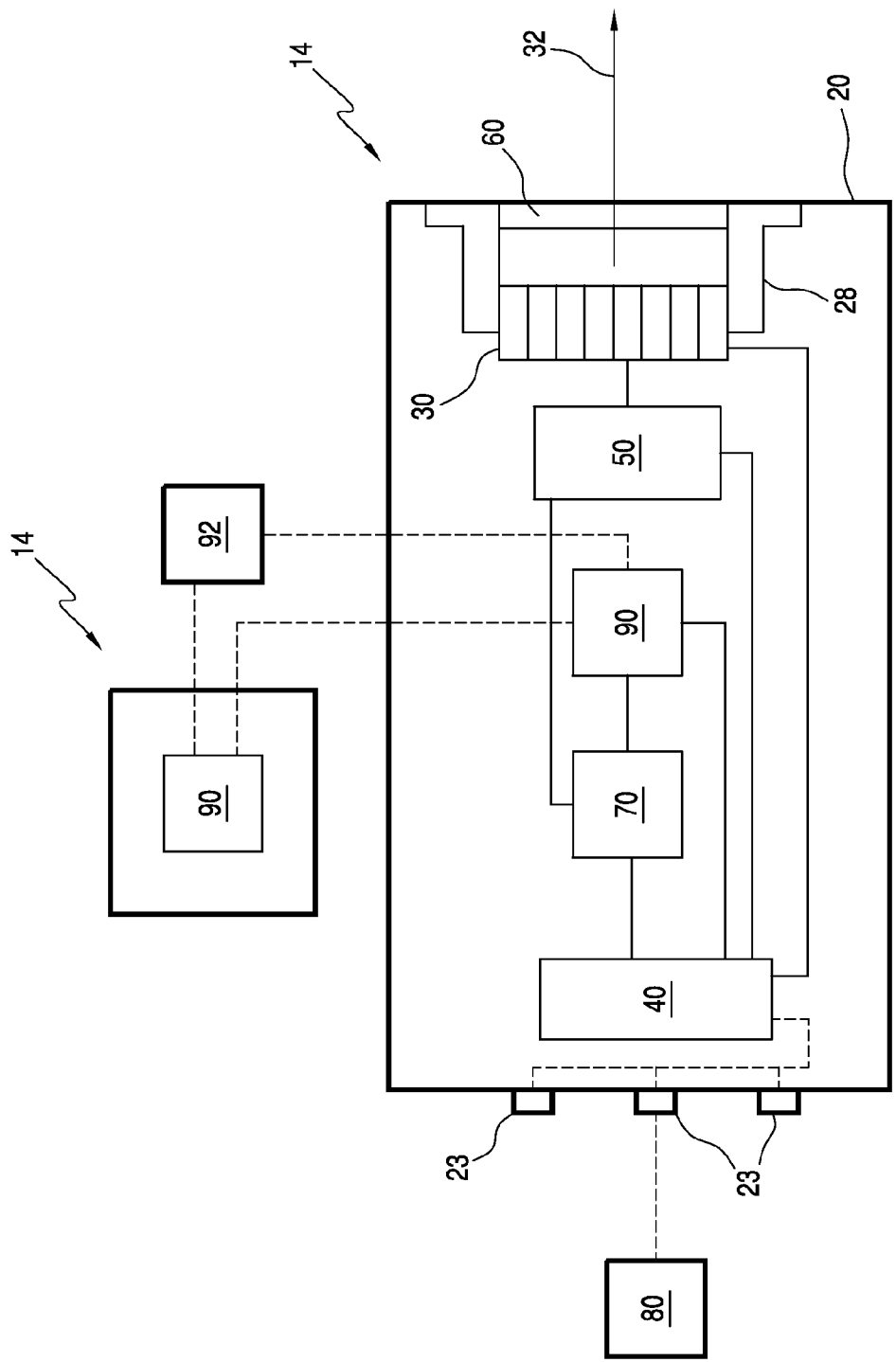
FIG. 1 is a schematic view of a beam emitter according to an exemplary embodiment of the present disclosure.

FIG. 1 illustrates a beam emitter 14 according to an exemplary embodiment of the present disclosure. The beam emitter 14 may emit one or more beams of radiation in the optical portion of spectrum or in the thermal band. In addition, the beam can be a continuous wave, a temporally modulated beam, or a temporally encoded signal, wherein the temporally encoded signal can be encrypted or unencrypted. Thus the beam emitter 14 may be, for example, any type of radiation source capable of emitting radiation in the form of one or more thermal or optical beams, pulses, or other identifiable signal types. Such an optical beam may have a wavelength between approximately 0.3 µm and approximately 2 µm, and such a thermal beam may have a wavelength between approximately 2 µm and approximately 30 µm. As shown in FIG. 1, such an exemplary beam emitter 14 may comprise a quantum cascade laser ("QCL") 30 or other radiation source known in the art. The beam emitter 14 may also include a housing 20, a driver 40, a cooler 50, a lens 60, and a power supply 70.

The housing 20 can be configured for handheld use, firearm mounting, or mounting to any of the unmanned devices 12 discussed herein. The housing 20 is selected to encompass at least one of the QCL 30, the driver 40, the cooler 50, the lens 60, and the power supply 70. In one configuration, the housing 20 encompasses, substantially encloses, and/or otherwise retains all of the components required for operation of the QCL 30. That is, the housing 20 provides the beam emitter 14 as a self-contained, handheld, and/or otherwise portable device.

The housing 20 can include an aperture 21 for emission of a beam or other signal from the QCL 30. In addition, the housing 20 can include one or more apertures, switches, connectors, or ports 23 for controlling, activating, deactivating, and/or powering the beam emitter 14. The ports 23 may comprise, for example, an on/off switch, switches or controls for operating mode selections, and/or power connectors configured to assist in connecting the beam emitter 14 to a power supply 80 of the unmanned device 12 to which the beam emitter 14 is connected. Each of the ports 23 may be connected to the driver 40 through any known electrical connection such that power, control commands, or other signals may be communicated from the ports 23 to the driver 40. Such ports 23 may facilitate remote activation and/or deactivation of the beam emitter 14. As will be described in greater detail below, the beam emitter 14 may further include any combination of transponders, antennas, power circuits, receivers, and/or other known components to facilitate such remote control and/or operation. Such components may also assist in, for example, conserving stored energy of the power supply 70. For example, the beam emitter 14 may be configured to operate in a relatively low current mode of operation until receiving an activation signal. Upon receipt of such a signal, the beam emitter 14 may, for example, change modes and begin emitting a desired beam of radiation.

The housing 20 can be formed of any of a variety of rigid material such as composites, laminates, plastics or metals. In one configuration, the housing 20 may be formed of an extruded aluminum, thereby providing sufficient strength without requiring significant weight. However, it is understood the housing 20 can be machined such as by EDM (electrical discharge machining) or molding if composites, laminates, plastics or even metals are employed for the housing 20. The housing 20 may be substantially watertight so as to protect the components disposed therein from water or other harmful contaminants found in rugged environments such as combat arenas.

In one configuration of the beam emitter 14, the housing 20 may be configured to mount to any of a variety of handheld, side, and small firearms. Such firearms include, but are not limited to, pistols, rifles, shotguns, automatic arms, semi-automatic arms, and bows. For example, the housing 20 may be configured to mount to any known sidearm, as well as any known dismounted crew-served weapon, such as machine guns and the like. The housing 20 can interface with any of a variety of clamping or mounting mechanisms such as a Weaver-style Picatinny rail or dove tail engagement for mounting to these firearms.

Alternatively, the housing 20 may be configured to mount to any of a variety of unmanned devices 12 used in surveillance, law enforcement, reconnaissance, target marking, friendly force marking, or combat applications. In exemplary embodiments, such unmanned devices 12 may include, but are not limited to, any unattended ground sensors, self-righting camera balls, and other like portable devices. In further exemplary embodiments such an unmanned device 12 may include an unmanned aerial vehicle (FIG. 2), an unmanned ground vehicle, an unmanned aqueous vehicle, a mobile robot, and/or any other known mobile unmanned device capable of remote control. In such exemplary embodiments, any and/or all components of the beam emitter 14 may be integrally incorporated into such devices 12, and in such embodiments, the housing 20, or portions thereof, may be omitted if desired. For example, in an embodiment in which the beam emitter 14 is formed integrally with an unmanned ground vehicle, an unmanned aqueous vehicle, a mobile robot, an unattended ground sensor, or other like device 12, the components of the beam emitter 14 may be hermetically sealed within such devices and the housing 20 may be omitted to reduce size, weight, space, power consumption, and/or drag associated with the beam emitter 14. In such embodiments, one or more windows, lenses, domes, or other components may be employed proximate an outer surface of the device 12 to facilitate emission of radiation from the integral beam emitter components.

The exemplary unmanned devices 12 described herein may be capable of stealthily approaching unsuspecting targets. For example, as will be described in greater detail below, in exemplary embodiments, such unmanned devices 12 may be configured to approach one or more targets without being detected by sensors, monitoring devices, thermal detectors, cameras, and/or other like components thereof. In such embodiments, once the unmanned device 12 arrives proximate and/or at the target, the beam emitter 14 carried by the unmanned device 12 may be activated to interact with such components of the target. For example, the beam emitter 14 may be activated to reduce the functionality of a thermal detector associated with the target.

With continued reference to FIG. 1, the QCL 30 may be retained within, connected to, and/or otherwise associated with the housing 20. The QCL 30 may be configured, via the lens 60, to produce a beam of radiation extending along a beam path 32. It is understood that any of a variety of lenses 60, windows, domes, diffraction gratings, filters, prisms, mirrors, and/or other like optical components, or combinations thereof, may be disposed optically downstream of the QCL 30 along the beam path 32. Due to their position along and/or within the beam path 32 and optically downstream of the QCL 30, radiation emitted by the QCL 30 may pass through, be shaped by, and/or otherwise optically interact with such optical components before exiting the housing 20. In an exemplary embodiment, one or more lenses 60 of the type described herein may be positioned in the beam path 32 and optically upstream of a window, dome, or other like optical component. In some exemplary embodiments, the beam path 32 may extend from the QCL 30, through a portion of the housing 20, and through at least one of the optical components described above. Such a beam path 32 may further extend from the at least one optical component to a location external to the housing 20. Such a location may be, for example, a location disposed on or within a target. For example, such a location may comprise a pixel, a plurality of pixels, and/or a portion of a thermal detector associated with the target.

The QCL 30 may be selected to operate in ambient temperature conditions while producing a beam having a wavelength between approximately 1 $\mu$m and approximately 30 $\mu$m. In exemplary embodiments, the emitted beam may have a preferred wavelength between approximately 2 $\mu$m and approximately 5 $\mu$m, or between approximately 7 $\mu$m and approximately 30 $\mu$m. Although a single QCL 30 is shown in housing 20, it is contemplated that a plurality of QCLs 30 can be disposed within the housing 20, some or all of the QCLs 30 emitting radiation at different respective wavelengths. In additional exemplary embodiments, a single QCL 30 can be employed with an appropriate driver 40 and/or filter to provide a plurality of corresponding wavelengths.

The QCL 30 may exhibit the electrical behavior of a semiconductor material which can be described with the band model. This model states that various energy ranges, or energy bands, are available to the electrons of the semiconductor material, and that the electrons of the semiconductor material can essentially take on any energy value within the energy bands. Various bands can be separated from one another by a band gap, i.e., an energy band with energy values the electrons cannot possess. If an electron changes from a higher energy band to a lower energy band, energy corresponding to the difference of the energy values of the electron before and after the change, which is also called "transition", is released. The energy difference can be released in form of photons. The band with the highest bound-state energy level, which is fully filled with electrons at a temperature of 0° Kelvin, i.e., the so-called valence band, and the conduction band that is energetically above the valence band, which is unfilled at 0° Kelvin, as well as the band gap between them are of special significance for a semiconductor material.

In the cascades of QCLs, the semiconductor materials for the barrier layers and the quantum wells are selected such that the lower conduction band edge of the barrier material lies higher in energy than the lower conduction band edge of the quantum well material. The lower conduction band edge represents the lowest energy value that an electron can assume within the conduction band. The energy difference between the energy of the lower conduction band edge of the barrier material and the lower conduction band edge of the quantum well material is also called the conduction band discontinuity. As a result of this selection, the electrons of the quantum wells cannot readily penetrate the barrier layers and are therefore enclosed in the quantum wells. The electrons can only "tunnel" through a barrier layer into an adjacent quantum well in a quantum-mechanical process, with the probability of the occurrence of a tunneling process depending on the height of the conduction band discontinuity and the thickness of the barrier layer between the two quantum wells.

In the quantum well, the behavior of the electrons enclosed in the well is determined by quantum mechanics effects due to the small thickness of the layer (only a few nanometers). An essential effect is that the electrons in an energy band of the quantum well can no longer assume any energy value within the energy range of the band, but rather are confined to the energy values of specific energy levels, i.e., sub-bands. The energetic differences between the individual sub-bands are particularly high if the quantum well is very thin and the conduction band discontinuity is high. The electron energy does not change continuously, but rather jumps from one sub-band to the next. The electron can change from one energy level to the other energy level only if the energy increase or the energy decrease suffered by an electron corresponds precisely to the difference of the energy values of two sub-bands. Transitions from one energy level to another energy level within one and the same band are called inter-subband transitions. In the cascades of the QCL, the emission of laser radiation occurs at these intersubband transitions. For emission of signals having wavelengths between approximately 2.9 μm and 5.3 μm at room temperature, the QCL 30 as set forth in U.S. Publication No. 2005/0213627, published Sep. 29, 2005, assigned U.S. patent application Ser. No. 11/061,726, filed Feb. 22, 2005, is hereby expressly incorporated by reference.

In one configuration, the QCL 30 or other beam source of the present disclosure may be hermetically sealed within the housing 20, thereby providing a controlled humidity and atmosphere for operation of the QCL 30. Such hermetic sealing can include a subhousing or potting of the QCL 30. The sealing can include a sealing of the housing 20, a sealing of the QCL 30 as the QCL 30 is retained within the housing 20, or both.

In a further exemplary embodiment, the beam source of the beam emitter 14 may comprise an infrared laser (such as at 830 nm) and/or a visible laser (400 nm to 750 nm), such as a model HL6321 MG laser manufactured by Hitachi. In such exemplary embodiments, the QCL 30 may be omitted. It is further understood that the QCL 30 may be replaced with one or more carbon dioxide lasers and/or any other type of laser known in the art. Such lasers may be useful in any of the applications discussed herein.

The driver 40 may be configured to assist in tuning and/or otherwise controlling the output of the QCL 30. The driver 40 can be constructed to provide either pulsed or continuous operation of the QCL 30. The rise/fall time of the pulse, compliance voltage and current for the QCL are selected to minimize power consumption and heat generation. These parameters may also be selected to produce a beam having a desirable wavelength, frequency, and/or other quantifiable characteristic. The driver 40 may be located within the housing 20, and may be operably connected to the QCL 30, the cooler 50, and/or the power supply 70. Alternatively, the power supply 70 may be omitted and the driver 40 may be operably connected to a power supply 80 of the device 12 to which the beam emitter 14 is connected. The driver 40 may include a pulse generator, an amplifier, a pulse switcher, and/or other known driver components.

The driver 40 may enable operation of the QCL 30 as a continuous or pulsed laser, such as by passive, active, or controlled switching. Although specific values depend upon the particular QCL 30 and intended operating parameters, it is contemplated the peak power draw of the driver 40 may be between approximately 1 amp and approximately 10 amps, with an average current draw between approximately 0.01 amps and approximately 0.1 amps. As the required voltage may be between approximately 9 volts and approximately 12 volts, approximately 9 W and approximately 120 W may be consumed. This may represent a substantial power consumption as well as heat generation. Accordingly, in an exemplary embodiment it may be desirable to omit the power supply 70 of the beam emitter 14, and instead, utilize the power supply 80 of the unmanned device 12.

In an exemplary embodiment, the driver 40 may assist in controlling and/or modifying the power level of the QCL 30 to aid in penetrating components or conditions of the atmosphere in which the beam emitter 14 is used. Such components or conditions may include, for example, snow, rain, fog, smoke, mist, clouds, wind, dust, gas, sand, and/or other known atmospheric or airborne components. For example, the driver 40 may be configured to controllably, manually, and/or automatically increase the current and/or voltage directed to the QCL 30 to strengthen and/or intensify the beam emitted by the QCL 30 in such conditions. It is also understood that the beam emitter 14 may comprise at least one midrange QCL and at least one long range QCL to ensure satisfactory operation in such conditions.

The lens 60 may be disposed in the beam path 32 such that in one configuration, the lens 60 is retained substantially within the housing 20. However, it is contemplated the lens 60 can form an interface between the interior and the exterior of the housing 20. The lens 60 can be configured to collimate the beam and/or to focus the beam at a particular point. Alternatively, the lens 60 may be configured to spread or diverge the signal or beam as broadly as possible to maximize coverage. In an exemplary embodiment, the lens 60 can be a dedicated collimator, thereby collimating the beam along the beam path 32. The lens 60 may be formed of a material substantially transparent to the wavelength of the beam emitted by the QCL 30. In an alternative configuration, a diffractive optic (not shown) can be located within the beam path 32 to provide collimation of the beam. That is, the diffractive optic may intersect the beam path 32 such that the beam passes through or reflects off the diffractive optic. Any of the lenses 60 and/or other optical components described herein may be used to intensify the beam emitted by the QCL for desired interaction with one or more thermal detectors associated with a given target.

In an exemplary embodiment, the power supply 70 may include at least one battery. Depending upon the anticipated power requirements, available space, and weight restrictions, the batteries can be N-type batteries or AA or AAA batteries. Additionally, a lithium/manganese dioxide battery such as military battery BA-5390/U, manufactured by Ultralife Batteries Inc. of Newark, N.Y. can be used with the beam emitter 14. It is understood that any type of power supply 70, preferably portable and sufficiently small in size for use with any of the unmanned devices 12 discussed herein, can be utilized. The battery-type power supply can be disposable or rechargeable.

The power supply 70 may be located within or external to the housing 20. In one configuration, the housing 20 may include a battery compartment sized to operably retain the power supply 70. The battery compartment can be formed of a weather resistant, resilient material such as plastic, and shaped to include receptacles for receiving one or more batteries or other power storage devices. Further, the battery compartment may be selectively closeable or sealable to prevent environmental migration into the compartment.

The power supply 70 may be operably connected to the driver 40 and can be controlled by or utilized under driver commands. Thus, the amount of power from the power supply 70 can be controlled or varied to alter the output of the QCL 30. As discussed above, however, the beam emitter 14 and each of its components may also be powered by one or more power supplies 80 of the unmanned device 12 to which the beam emitter 14 is connected. In such an exemplary embodiment, the power supply 70 may be omitted, and the driver 40 and/or other power distribution devices of the beam emitter 14 may distribute power from the power supply 80 to the beam emitter components.

In a further configuration, a cooler 50 can be disposed in thermal contact with the QCL 30. The cooler 50 may be disposed within the housing 20, and may be employed to maintain the QCL 30 at a desirable operating temperature. As certain configurations of the cooler 50 require energy input, it is advantageous that the housing 20, the QCL 30 and the driver 40 be configured to minimize thermal demands on the cooler 50. For example, at least a portion of the QCL 30 may be disposed outside of the housing 20 such that the QCL 30 is at least partially cooled by wind, atmospheric temperature, water, or other aspects of the external environment in which the beam emitter 14 is used.

In an exemplary embodiment, the cooler 50 may assist in cooling the QCL 30 to approximately room temperature or between approximately 65° Fahrenheit and approximately 75° Fahrenheit. In additional exemplary embodiments, the cooler 50 may be configured to cool the QCL 30 to temperatures below room temperature, such as to approximately 32° Fahrenheit or lower. In such exemplary embodiments, one or more barriers, seals, walls, compartments, absorbent materials, and/or other like components may be employed proximate the QCL 30 to assist in isolating the QCL 30 from any condensation or moisture formed on and/or by the cooler 50.

Such components may be included within the housing 20, or in alternative exemplary embodiments in which the beam emitter 14 is formed integrally with the unmanned device 12 and at least a portion of the housing 20 has been omitted, such components may also be disposed within and/or formed integrally with the device 12. The cooler 50 may comprise a thermoelectric cooler or any other cooler known in the art.

The cooler 50 can be a passive device or an active device. A passive cooler 50 may comprise a heat sink, a phase change element, a radiator, and/or one or more fins configured to dissipate thermal energy from the QCL 30. As used herein, a "phase change element" may include any element and/or material configured to absorb heat energy and utilize the absorbed energy to change the phase of, for example, a solid to a liquid. An active cooler 50 may comprise a Peltier module, a Stirling device, and/or one or more fans.

In a further exemplary embodiment, the beam emitter 14 may include a communicator 90 such as a receiver, a transmitter, and/or a transceiver for receiving and/or transmitting information from a remote source 92. As described above, such components may be operably connected to and/or connectable via one or more of the ports 23. Such information can include targeting data, strategic data, signaling data, emission data, operating or control signals, and/or other like data or signals useful in combat, law enforcement, reconnaissance, stealth thermal detector and/or target interaction, and/or other like exercises. The communicator 90 may be operably connected to the power supply 70, 80 as well as well as the driver 40. Accordingly, the beam emitter 14 may be capable of communicating with the remote source 92 via the communicator 90. The communicator 90 and the remote source 92 may be capable of radio and data transmission at wireless frequencies, and/or other communication for the transmission of information, data, control signals, and the like. In an exemplary embodiment, such control signals may include on/off commands as well as control commands for remotely changing the pulse signature, frequency, wavelength, intensity, and/or other characteristics of the beam emitted by the QCL 30. Such control signals may also be indicative of the location of one or more targets. In such embodiments, the remote source 92 may be in communication with the beam emitter 14 and/or the unmanned device 12, via the communicator 90, and the unmanned device 12 may be configured to move to the identified location of the target in response to the control signal. It is understood that corresponding functions, activation, and/or operation of the QCL 30 and/or the driver 40 may also be changed or controlled in response to such control signals.

In still further exemplary embodiments, in various exercises or application, two or more unmanned devices 12 may be utilized in concert. For example, two or more unmanned devices 12 may be equipped with respective beam emitters 14, and the two or more unmanned devices 12 may be controlled remotely such that each respective beam emitter 14 may interact with a thermal detector associated with a target at substantially the same time. As shown schematically in FIG. 1, in such embodiments the communicators 90 of the two or more beam emitters 14 may be in communication with each other as described above, as well as with the remote source 92. Alternatively or in addition, each of the two or more unmanned device 12 may include like communicators 90 enabling communication between the unmanned devices 12 and/or their respective beam emitters 12, as well as with the remote source 92.

In exemplary embodiments, the beam emitter 14 may also include one or more aiming devices 28. Such aiming devices 28 may comprise one or more motors, tracks, shafts, brackets, guides, slides, and/or other like devices configured to controllably impart movement to and/or govern movement of the QCL 30. Such movement may be useful in aiming the beam emitted by the QCL 30 at one or more targets. For example, the aiming device 28 may be configured to move the QCL 30 relative to the housing 20 and/or the unmanned device 12 to facilitate rastoring the emitted beam. As used herein, the term "rastoring" may be defined as moving substantially linearly in a first direction (such as, for example, a first horizontal direction), moving incrementally in a second direction (such as, for example, a first vertical direction) substantially transverse to the first direction, and then moving in a third direction (such as, for example, a second horizontal direction) opposite the first direction. It is understood that, in further embodiments, the beam emitted by the QCL 30 may be rastored through movement of the unmanned device 12 while keeping the beam emitter 14 and/or the QCL 30 substantially stationary relative to the unmanned device 12.

Figure 2:
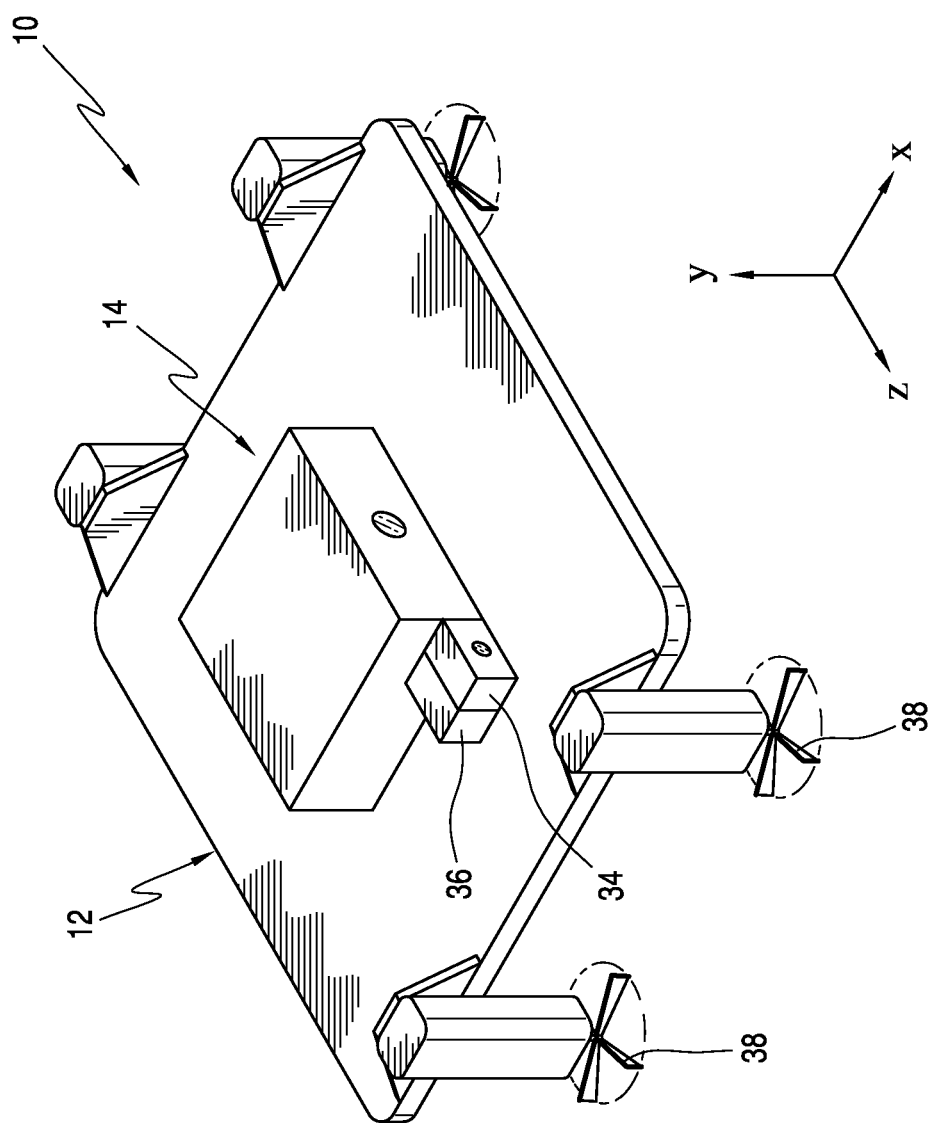
FIG. 2 is an isometric view of an unmanned device according to an exemplary embodiment of the present disclosure.

As shown in FIG. 2, the unmanned device 12 may also include one or more sensors 34 and a controller 36 in communication with the sensor 34. The sensor 34 may comprise, for example, a temperature sensor, a radiation sensor, and/or any other like sensor configured to sense, detect, measure, calculate, and/or otherwise determine a characteristic of the environment in which the unmanned device 12 is operating. For example, the sensor 34 may be an optical radiation sensor, a thermal radiation sensor, a radiation wavefront sensor, and/or other like sensor configured to detect and/or determine characteristics of such radiation. In such embodiments, the sensor 34 may be configured to collect and/or otherwise receive such radiation, and may be configured to generate a signal indicative of such radiation. As shown in FIG. 2, the sensor 34 may be a component of the unmanned device 12 and may be mounted thereto at any convenient location. In still further embodiments, it is understood that the sensor 34 may be a component of the beam emitter 14, and may be disposed internal or external to the housing 20.

In exemplary embodiments, the radiation received by the sensor 34 may comprise emitted, reflected, refracted and/or other like radiation in either the thermal or optical band. For example, the sensor 34 may be configured to detect a wavefront of radiation reflected, refracted, and/or emitted by a target proximate the unmanned device 12. In such embodiments, the sensor 34 may be configured to determine the type of object or source from which such radiation has been reflected, refracted, and/or emitted. Such sensors 34 may be configured to distinguish between various types of objects or radiation sources based on characteristics of the received radiation. For example, the sensor 34 may be configured to determine the type of object or source based on characteristics of the wavefront of radiation received by the sensor 34. As will be described in greater detail below, the sensor 34 may be configured to determine the presence of, for example, a lens, mirror, window, and/or other optical device of the target based on characteristics of the detected wavefront. In such embodiments, the sensor 34 may be configured to generate a signal indicative of the presence and/or type of such a component of the target. It is also understood that in exemplary embodiments, the sensor 34 may include one or more components configured to emit radiation, and in such embodiments, the wavefront of radiation received by the sensor 34 may comprise radiation initially emitted by the sensor components and reflected off of a lens, mirror, window, and/or other optical device of the target.

The signal generated by the sensor 34 may be directed to the controller 36, and the controller 36 may communicate with the driver 40, the QCL 30, and/or other components of the beam emitter 14 to control various operations thereof in response to such a signal. Alternatively, the signal generated by the sensor 34 may be sent directly to the driver 40, the QCL 30, and/or other components of the beam emitter 14. For example, in such embodiments the QCL 30 may be configured to generate a beam of thermal radiation in response to the signal received from the sensor 34.

The controller 36 may be a microprocessor and/or any other known device configured to control operation of the unmanned device 12 and/or the beam emitter 14. In exemplary embodiments, the controller 36 may comprise one or more processors, data busses, memory devices, control circuits, and/or other like components. Such components may assist the controller 36 in operating the unmanned device 12, the sensor 34, and/or the beam emitter 14. For example, the controller 36 may be configured to activate the sensor 34, process signals received from the sensor 34, and/or activate the QCL 30 in response to such signals.

Additionally, the controller 36 may be configured to control movement of the unmanned device 12 in response to, for example, control signals received from the remote source 92. In such embodiments, the controller 36 may be in communication with the remote source 92 directly and/or via the communicator 90. The controller 36 may also be in communication with multiple unmanned devices 12, either directly or via the communicator 90, via respective communicators 90 of the multiple unmanned devices 12. In such embodiments, the respective controllers 36, communicators 90, and/or the remote source 92 may facilitate communication between the multiple unmanned devices 12, and may provide for movement and/or operation of the multiple unmanned devices 12 in concert. In exemplary embodiments, such movement and/or operation of the multiple unmanned devices 12 "in concert" may comprise substantially simultaneous movement of the multiple unmanned devices 12 relative to an identified target and/or substantially simultaneous operation of the respective QCLs 30.

As shown in FIG. 2, the unmanned device 12 may include one or more components configured to facilitate movement of the unmanned device 12. For example, in embodiments in which the unmanned device 12 comprises an unmanned aerial vehicle, the unmanned device 12 may comprise one or more propellers 38, turbines, and/or other like propulsion devices. In such embodiments, the unmanned device 12 may comprise a plurality of propellers 38 controlled by the controller 36 described above. In such embodiments, operation of the propellers 38 may be configured to propel, maneuver, and/or otherwise move the unmanned device 12 parallel, perpendicular, and/or at any desired angle relative to the X, Y, and/or Z directions shown in FIG. 2. Accordingly, such movement of the unmanned device 12 may comprise one, two, and/or three-dimensional movement, and the propellers 38 may be configured to propel the unmanned device 12 at any desired speed. In exemplary embodiments, other devices may be used in place of propellers 38 to facilitate movement of the unmanned device 12. As described above, one or more such unmanned devices 12 may be remotely controlled. For example, these unmanned devices 12 may be controlled to fly, traverse ground terrain, maneuver underwater, and/or otherwise move in response to a control signal received from the remote source 92. Alternatively, unmanned devices 12 such as the unmanned aerial vehicle shown in FIG. 2 may be preprogrammed to fly without dependence upon receipt of a remote control signal.

Figure 3:
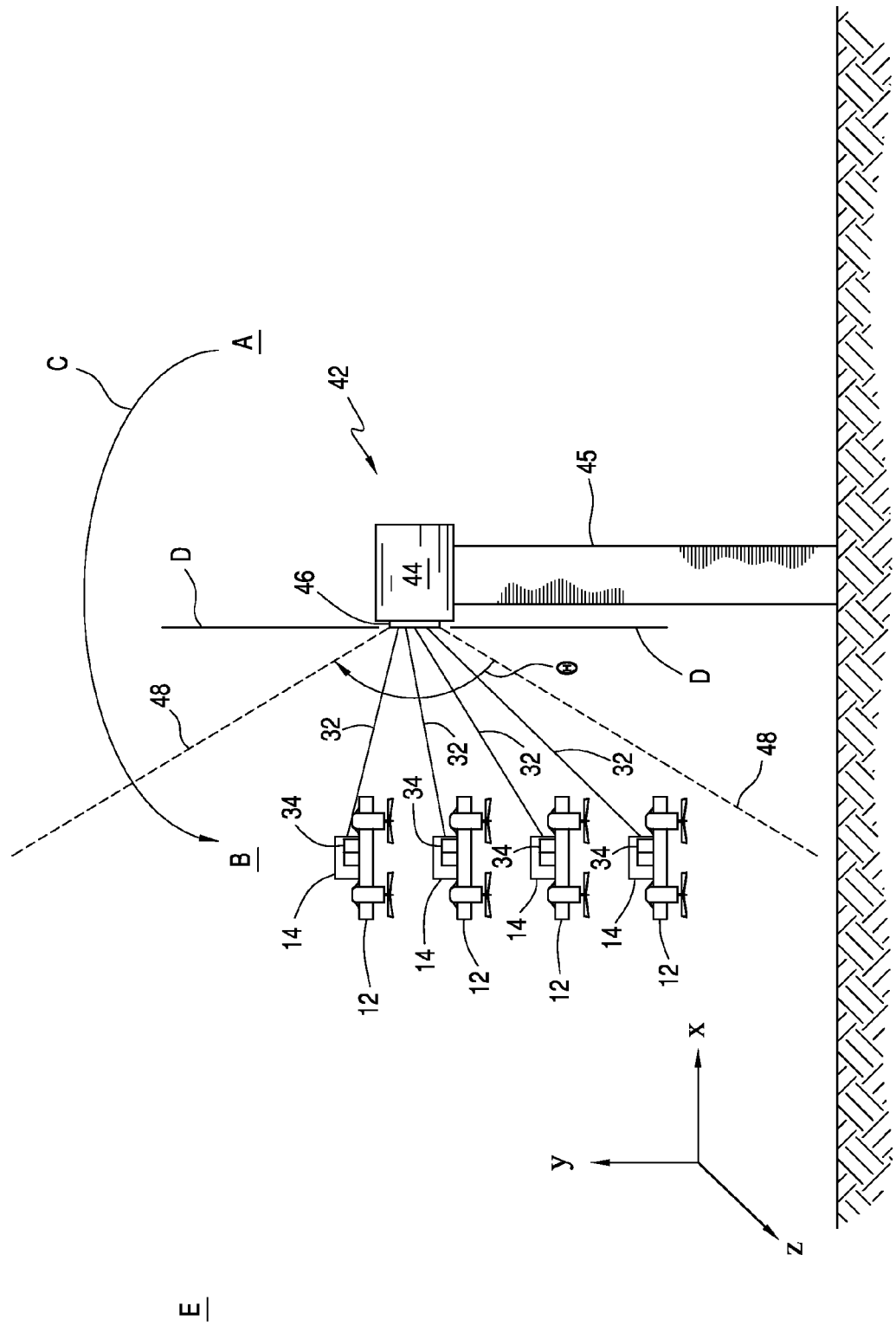
FIG. 3 illustrates a system for interacting with a thermal detector according to an exemplary embodiment of the present disclosure.

FIG. 3 illustrates an exemplary system 10 for interacting with one or more stationary and/or moveable targets 42. In exemplary embodiments, such targets 42 may comprise a thermal detector 44, a thermal viewer, and/or other like devices. In exemplary embodiments in which the target 42 comprises a stationary target, an exemplary thermal detector 44 may be mounted to a building, a post 45, a fence, a barrier wall, and/or other like stationary object. Alternatively, in embodiments in which the target 42 comprises a moveable target 42, the thermal detector 44 may be mounted to a ground vehicle, an aerial vehicle, an aqueous vehicle, a sub-aqueous vehicle, and/or other like moveable object. In still further embodiments in which the target 42 comprises a moveable target 42, the thermal detector 44 may be mounted to a helmet or other object worn or carried by a human, such as a law enforcement officer, a security guard, or a ground soldier.

The thermal detector 44 may be any device or combination of devices configured to receive radiation and to interpret characteristics of the received radiation. For example, the thermal detector 44 may comprise a focal plane array such as, for example, a microbolometer array, or other like device. In each of the exemplary embodiments described herein, the thermal detector 44 may comprise any type of known pixel array, and such an array may include one or more pixels. Such an array may be cooled or uncooled depending on the desired application. In an additional exemplary embodiment, the thermal detector 44 may comprise a readout integrated circuit or other like component configured to detect a temporally modulated thermal input and produce an enhanced digital output signal based on the detected thermal input.

In an exemplary embodiment, the radiation received by the thermal detector 44 may pass through one or more optical components of the thermal detector 44 such as, for example, a lens 46, window, and/or other like component, and may impinge upon a downstream component of the thermal detector 44, such as the focal plane array described above. In exemplary embodiments, such a lens 46 may comprise a zinc selenide lens, a germanium lens, and/or a chalcogenide lens, and such lenses 46 may be configured to transmit mid and/or long range infrared radiation impinging thereon to the focal plane array.

Additionally, when radiation of a desired wavelength impinges upon such a lens 46, the lens 46 may reflect a portion of such radiation. The reflected radiation may pass from the lens 46 in the form of a wavefront, and such a wavefront may be detected by the one or more sensors 34 described above. In particular, the wavefront of radiation reflected by the lens 46 may have a wavelength, frequency, spectral pattern, and/or other identifiable characteristics indicative of the particular type, shape, power, and/or other configuration of the lens 46 used by the thermal detector 44. In exemplary embodiments, such characteristics may be indicative of, for example, the particular materials used to form the lens 46. One of ordinary skill in the art will recognize that such wavefront characteristics may distinguish the lens 46 from other like lenses made from different materials and/or having different configurations. Such wavefront characteristics may also distinguish the lens 46 from a window, a prism, a mirror, and/or other known optical components. In still further embodiments, such characteristics may distinguish the lens 46 from, for example, a building wall, the side of a vehicle, a substantially flat surface, and/or other objects that may be capable of reflecting radiation impinging thereon. As a result, the one or more sensors 34 may be configured to distinguish the lens 46 from other such objects based on the characteristics of the wavefront captured by the sensors 34.

As radiation received by the thermal detector 44 passes through the lens 46 and impinges upon the focal plane array, the radiation may heat a portion of the array, thereby changing the electrical resistance of the heated portion. This resistance change may be measured and processed by, for example, a readout integrated circuit and/or other components of the thermal detector 44. For example, pixels of the focal plane array may be heat sensitive, and may exhibit a change in resistance when radiation is incident thereon. This radiation may be utilized to create an image shown on a display (not shown) associated with the thermal detector 44 so as to be viewable by a user.

Figure 4:
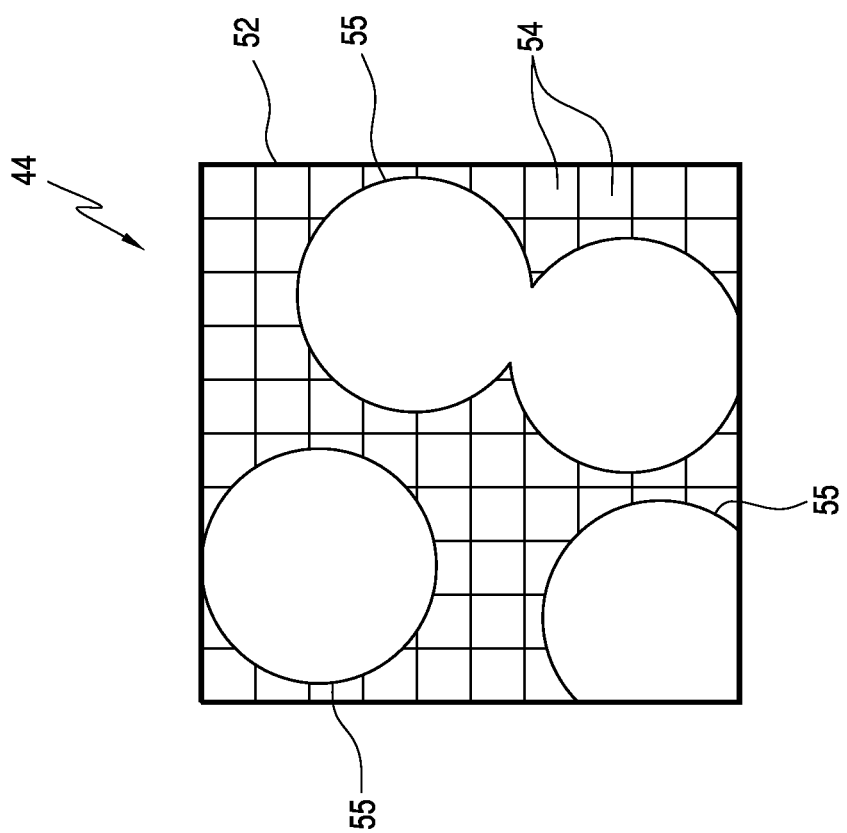
FIG. 4 illustrates an exemplary focal plane array associated with the thermal detector of FIG. 3.

As shown in FIG. 3, the thermal detector 44 may have and/or may be characterized by a detection range 48. The detection range 48 may comprise a two or three-dimensional zone within which radiation may be sensed and/or detected by the thermal detector 44. In exemplary embodiments, the detection range 48 may be substantially conical and may extend from a plane D, defined by the lens 46, at any desired angle. It is understood, that the size, shape, direction, and/or other characteristics of such a detection range 48 may be governed by the characteristics of the lens 46, the focal plane array associated with the thermal detector 44, and/or other components of the thermal detector 44. In exemplary embodiments, the detection range 48 may extend from the lens 46 and/or the plane D, and maybe characterized by an included angle $\Theta$. In such embodiments, the larger the included angle $\Theta$, the larger the detection range 48 of the thermal detector 44. In exemplary embodiments, objects and/or radiation disposed at locations A, E outside of the detection range 48 of the thermal detector 44 may not be detected by the thermal detector 44, while objects and/or radiation disposed at locations B within the detection range 48 of the thermal detector 44 may be detected. In exemplary embodiments, the detection range 48 may comprise a field of view of the focal plane array associated with the thermal detector 44. An exemplary focal plane array 52 of the thermal detector 44 comprising a plurality of pixels 54 is illustrated in FIG. 4.

With continued reference to FIG. 3, it is understood that locations outside of the detection range 48 may include locations E remote from the thermal detector 44, as well as locations A substantially oblique to the lens 46 and/or the plane D defined thereby. In exemplary embodiments, locations A outside of the detection range 48 may also include locations above, below, to the side of, and/or behind the lens 46 and/or the thermal detector 44 such that objects or radiation disposed at such locations A may not be seen by the thermal detector 44.

Use of the exemplary beam emitters 14 described herein in conjunction with the handheld marking devices, unmanned aerial vehicles, unmanned ground vehicles, and/or other like unmanned devices 12 has not been previously accomplished successfully due to the complications and complexities associated with using such beam emitters 14 in association with such devices. For example, beam emitters 14 including one or more QCLs 30 are generally not capable of use with unmanned aerial vehicles or unmanned ground vehicles due to, for example, the heat generated by the QCL 30 (and corresponding cooling requirements for efficient functionality), the power requirements of known QCLs 30, and relative ease with which such an expensive and delicate component may be damaged by sudden jarring, sudden change in direction, rapid acceleration, rapid deceleration, other like movement associated with such vehicles. Until now, these and other operating requirements specific to the QCL 30 have made it difficult, if not impossible, to utilize light, signal, beam, and/or radiation sources such as QCLs 30 for the operations described herein. In particular, such operating requirements previously prohibited using a QCL 30 in conjunction with an unmanned aerial vehicle or an unmanned ground vehicle to identify a remote thermal detector 44 and unexpectedly impinge a beam of thermal radiation onto, for example, a focal plane array 52 of the thermal detector 44, thereby rendering one or more pixels 54 thereof inoperable. The exemplary embodiments of the present disclosure overcome these known obstacles.

In an exemplary method of the present disclosure, the beam emitter 14 may be disposed on, coupled to, formed integrally with, and/or otherwise associated with the unmanned device 12 prior to its departure from a remote location E or from any other location A outside of the detection range 48. As shown in FIG. 3, an exemplary system 10 for interacting with the thermal detector 44 may include at least one unmanned aerial vehicle or other unmanned device 12. In an exemplary operation, one or more such unmanned device 12 may receive a control signal from, for example, the remote source 92 (FIG. 1). As described above, the remote source 92 may be configured to direct a control signal to one or more of the unmanned devices 12 and/or to the respective beam emitter 14 associated with each device 12. In such embodiments, the control signal received from the remote source 92 may be indicative of a location of the target 42. Such a control signal may comprise, for example, coordinates and/or other location information associated with the target 42 and/or indicative of the location of the thermal detector 44 associated with the target 42. In such embodiments, the control signal may be received by the communicator 90 and/or the controller 36, and the controller 36 may operate the propellers 38 and/or other like motion components associated with the unmanned devices 12 to move the unmanned devices 12 to the location.

For example, upon receipt of and/or otherwise in response to the control signal from the remote source 92, the unmanned device 12 may move to the identified location of the thermal detector 44. In such embodiments, the one or more unmanned devices 12 may move to the identified location of the thermal detector 44 from a location A, E outside of the detection range 48 of the thermal detector 44. An example of such movement is illustrated by arrow C shown in FIG. 3. In exemplary embodiments, such movement may assist the one or more unmanned devices 12 in approaching the thermal detector 44 without being detected and/or otherwise seen by the thermal detector 44. For example, in such methods the one or more unmanned devices 12 may not be detected by the thermal detector 44 until passing into the detection range 48 at relatively close range. In such embodiments, the one or more unmanned devices 12 may not be detected by the thermal detector 44 until passing into the detection range 48 at a distance of less than approximately 10 meters from the lens 46 and/or the thermal detector 44. Rapidly passing into the detection range 48 at such relatively close range may give the thermal detector 44 and/or other devices in communication therewith, relatively little time to react to the presence of the one or more unmanned devices 12 at a location B within the detection range 48.

In exemplary embodiments, upon arriving proximate the identified location of the thermal detector 44, the controller 36 may command the associated sensor 34 of the one or more unmanned devices 12 to determine the presence of a component of the thermal detector 44. For example, upon arriving proximate the identified location of the thermal detector 44 and prior to entering the detection range 48, at least one of the sensors 34 may look for and/or otherwise detect a wavefront of radiation reflected by the lens 46 of the thermal detector 44. In such embodiments, the sensors 34 may emit respective beams of radiation in the direction of the thermal detector 44, and the reflected wavefront may comprise radiation emitted by the sensors 34 and reflected by the lens 46 of the thermal detector 44. Upon detecting such a wavefront of radiation, the one or more sensors 34 may generate a respective signal indicative of the presence of the lens 46 and/or of the thermal detector 44, generally. Operation of the sensors 34 in this way may be controlled by the remote source 92 and/or by the controller 36 associated with each sensor 34. Further, information regarding the presence and/or precise location of the thermal detector 44 may be shared between the one or more unmanned devices 12 via the respective communicators 90.

Upon determining the presence and/or precise location of the thermal detector 44, the one or more unmanned devices 12 may move to a desired location at relatively close range relative to the thermal detector 44, such as the location B within the detection range 48. At such a location B, the respective beam emitters 14 of the one or more unmanned devices 12 may be activated to emit beams of thermal radiation in the direction of the thermal detector 44. For example, in embodiments in which multiple unmanned devices 12 are employed, the beam emitter 14 of each unmanned device 12 may be controlled to emit a beam of thermal radiation. The respective beams of thermal radiation may pass through the lens 46 and may impinge upon the pixels 54 of the focal plane array 52. As shown in FIG. 4, directing such beams of thermal radiation to the thermal detector 44 in this way may render at least one pixel 54 inoperable. In additional embodiments, directing such beams of thermal radiation to the thermal detector 44 in this way may render entire portions 55 (i.e, multiple pixels 54) of the focal plane array 52 inoperable, thereby greatly diminishing the utility of the thermal detector 44. In such embodiments, the multiple beams of thermal radiation directed to the thermal detector 44 may substantially fill the field of view of the focal plane array 52.

In exemplary embodiments, at least one unmanned device 12 may be configured and/or controlled to move relative to the thermal detector 44 while the QCL 30 of the beam emitter 14 directs the beam of thermal radiation to the thermal detector 44. In such embodiments, the unmanned device 12 may be controlled to move while within the field of view of the focal plane array 52 and/or the detection range 48 of the thermal detector 44. As described above, such movement may include one, two, and/or three dimensional movement of the unmanned device 12 relative to the thermal detector 44. Further, such movement may rastor the beam of thermal radiation across the focal plane array 52, thereby rendering portions 55 of the focal plane array 52 inoperable. For example, such movement may substantially fill the field of view of the focal plane array 52.

In further embodiments, at least one of the unmanned devices 12 may remain stationary relative to the thermal detector 44 while disposed within the detection range 48 and while the QCL 30 of the respective beam emitter 14 directs the beam of thermal radiation to the thermal detector 44. In such embodiments, the aiming device 28 associated with the QCL 30 of the beam emitter 14 may move the QCL 30 relative to the unmanned device 12 so as to rastor the beam of thermal radiation across the focal plane array 52. As described above, such rastoring may render portions 55 of the focal plane array 52 inoperable. In the exemplary embodiments described herein, rendering such portions 55 of the focal plane array 52 inoperable may reduce or substantially eliminate the ability of the thermal detector 44 to detect the presence of unmanned devices 12, manned vehicles, friendly forces, and/or other like objects disposed within the detection range 48.

Figure 5:
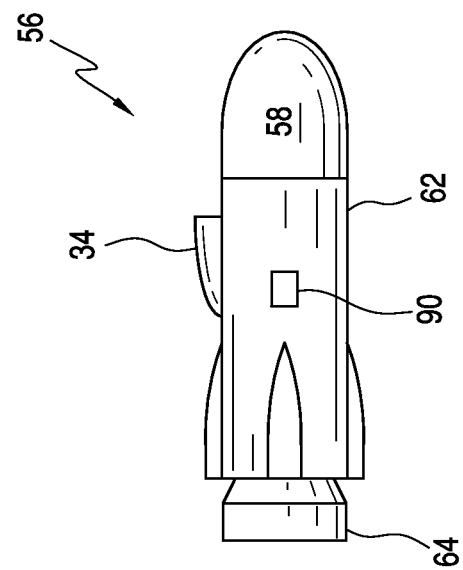
FIG. 5 illustrates a guided device for interacting with a thermal detector according to an exemplary embodiment of the present disclosure.
Figure 6:
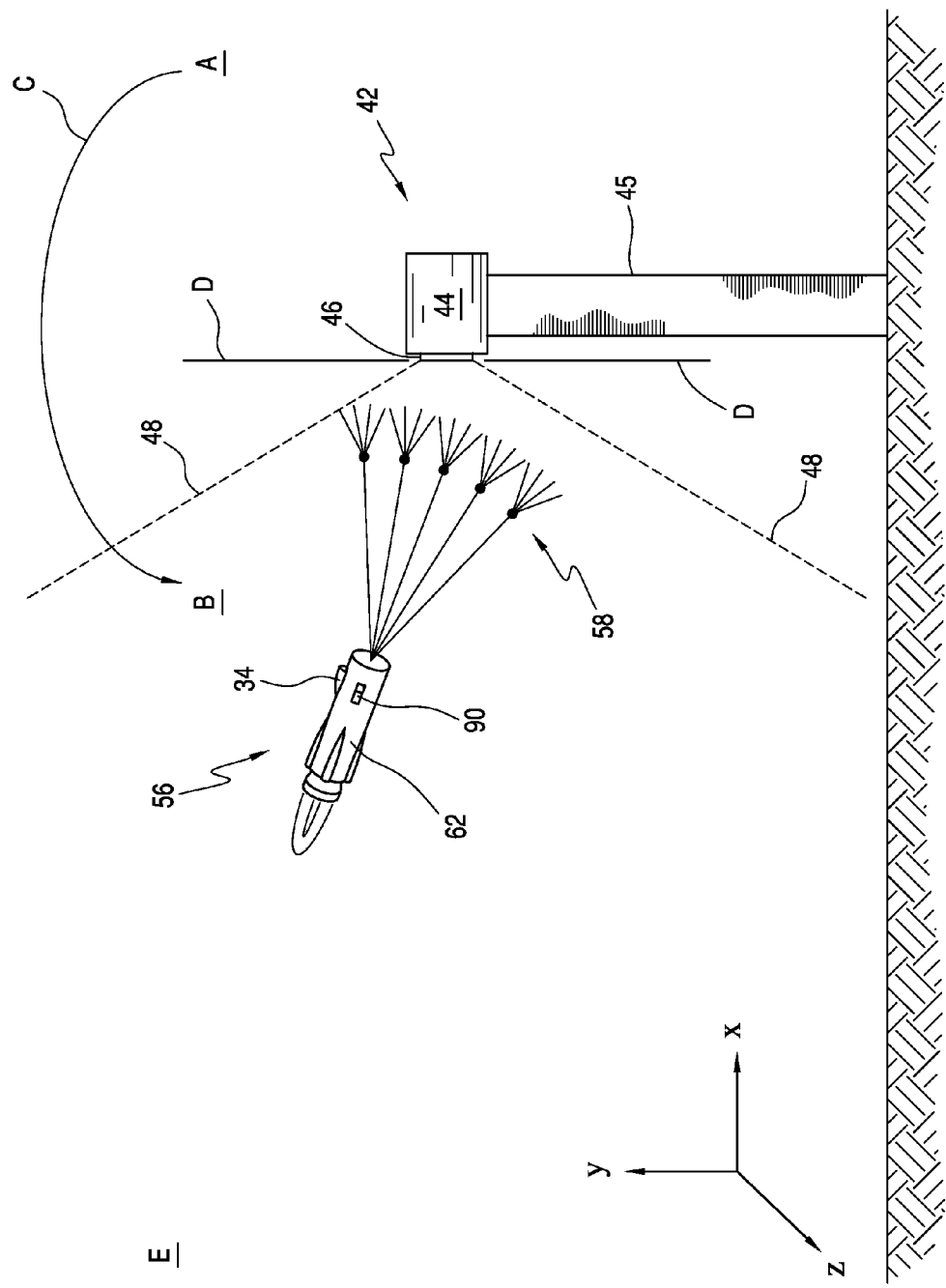
FIG. 6 illustrates a system for interacting with a thermal detector according to another exemplary embodiment of the present disclosure.

As shown in FIGS. 5 and 6, in still further exemplary embodiments, one or more guided devices 56 may be utilized in conjunction with and/or instead of the unmanned devices 12 described herein to effectively reduce or substantially eliminate the operability of the thermal detector 44. Wherever possible, like item numerals have been used throughout the present disclosure, and with respect to the exemplary illustrations of FIGS. 1-6, to identify like components.

In exemplary embodiments, such guided devices 56 may include, among other things, explosives 58 carried by a vehicle 62. Such explosives 58 may comprise any component or combination of components configured to produce a directional emission of radiation upon ignition thereof. As used herein, the term "directional emission" may be defined as radiation released and/or otherwise emitted in a desired direction, and such a direction may be with respect to one or more of the X, Y, and Z axes and/or with respect to a given target 42. For example, the explosives 58 may be designed, tuned, and/or otherwise configured to direct radiation in the optical and/or thermal band in the direction of a target 42 such as the thermal detector 44 shown in FIG. 6. In exemplary embodiments, the beam of radiation emitted by the QCLs 30 described above may also comprise a directional emission of radiation.

The guided device 56 may include, for example, an ejector, a detonator, and/or other like components (not shown) configured to assist in triggering the explosives 58 to generate such a directional emission. In exemplary embodiments, such triggering components may include an ignition device and/or a chemical catalyst configured to react with one or more components of the explosives 58. In such embodiments, a chemical reaction between the explosives 58 and the triggering component may generate the directional emission of radiation described above. In exemplary embodiments, the explosives 58 may be configured to emit a directional emission of thermal radiation in a direction toward the thermal detector 44 of the target 42 and away from, for example, thermal viewers and/or other like devices employed by friendly forces. Directing such radiation in this way may reduce or substantially eliminate the operability of the thermal detector 44 without harming thermal viewers used by the friendly forces. In particular, as described above with respect to at least FIG. 4, such a directional emission may render at least one pixel 54, and in some instances entire portions 55, of a focal plane array 52 associated with the thermal detector 44 inoperable.

The vehicle 62 of the guided device may include one or more propellers, turbines, engines, and/or other known propulsion devices 64 configured to impart movement to the guided device 56. As shown in FIG. 5, an exemplary vehicle 62 may be structurally and/or functionally similar to any known missile or rocket used in aircraft or military applications. In alternative embodiments, on the other hand, the vehicle 62 may be configured for ground-based and/or aqueous movement. In any of the embodiments described herein, the vehicle 62 may be configured to controllably deliver the explosives 58 to a desired location proximate the target 42. As shown in FIG. 6, in exemplary embodiments, such a location may comprise a location B within the detection range 48 of the thermal detector 44. Similar to the unmanned devices 12 described above, the vehicle 62 may travel to the location B from locations A, E outside of the detection range 48. Such movement of the vehicle 62 may be controlled in response to one or more control signals received by the vehicle 62 from a remote source 92. For example, the vehicle 62 may include one or more communicators 90 configured to receive such control signals and/or otherwise communicate with the remote source 92. As described above, such control signals may be indicative of a location of the target 42 and/or the thermal detector 44.

In additional exemplary embodiments, the vehicle 62 may also include one or more sensors 34 configured to determine the presence of a lens 46 and/or other components of the thermal detector 44. Such sensors 34 may be configured to generate a signal indicative of the presence of such components. In exemplary embodiments, the sensor 34 may direct such signals to the remote source 92 for processing. In additional embodiments, the vehicle 62 may include a controller 36 in communication with the sensor 34, the communicator 90, and/or the remote source 92. In such embodiments, the sensor 34 may direct such a signal to the controller 36 and/or the remote source 92 indicative of the presence of the lens 46. In response, the controller 36 and/or the remote source 92 may direct the vehicle 62 to move to a location B within the detection range 48. The vehicle 62 may move to the location B from, for example, a location A, E outside of the detection range 48. Once the vehicle 62 arrives at the location B, the controller 36 and/or the remote source 92 may activate the triggering component described above, thereby causing the explosives 58 to generate a directional emission. For example, as shown in FIG. 6, such a triggering component may cause the explosives 58 to emit a directional emission of thermal radiation in the direction of the thermal detector 44. The directional emission may render at least one pixel 54, and in some instances entire portions 55, of a focal plane array 52 associated with the thermal detector 44 inoperable.

Exemplary embodiments of the present disclosure may be useful in substantially reducing the effectiveness of thermal detectors 44 used by unfriendly or foe opposition groups. In particular, the unmanned devices 12, guided devices 56, and other device described herein may be configured to approach such thermal detectors 44 from locations outside of their associated detection range 48 without being detected. Such devices 12, 56 may also be capable of seeking and identifying thermal detectors 44 used by unfriendly or foe opposition groups through the use of sensors 34. Once the thermal detector 44 has been identified, such devices 12, 56 may be configured to pass into relatively close proximity to the thermal detector 44, and may be configured to deliver a beam of thermal radiation and/or other directed emission to one or more components of the thermal detector 44. As described herein, such radiation may be directed to a focal plane array 52 of the thermal detector 44 and may render one or more pixels 54 of the focal plane array 52 inoperable. As a result, the functionality and/or ability of the thermal detector 44 to detect approaching friendly forces may be compromised, and the safety of such friendly forces will be maximized.

Other embodiments of the present disclosure will be apparent to those skilled in the art from consideration of the specification and practice of the various embodiments disclosed herein. It is intended that the specification and examples be considered as exemplary only, with a true scope and spirit of the present disclosure being indicated by the following claims.

What is claimed is:

1. A system for interacting with a thermal detector, comprising: a plurality of unmanned aerial vehicles, wherein each vehicle of the plurality of unmanned aerial vehicles includes
    a beam emitter having a quantum cascade laser, and
    a sensor configured to determine the presence of a component of the thermal detector and to generate a signal indicative of the presence of the component,
    wherein the plurality of unmanned aerial vehicles is configured to move, in concert, relative to the thermal detector and each quantum cascade laser is configured to impinge a respective beam of thermal radiation upon a focal plane array of the thermal detector in response to the signal, thereby rendering a portion of the focal plane array inoperable;

a remote source in communication with the plurality of unmanned aerial vehicles;

wherein each vehicle of the plurality of unmanned aerial vehicles is configured to move within a field of view of the focal plane array while each respective beam of thermal radiation impinges upon the focal plane array, and wherein movement of each vehicle within the field of view rastors each respective beam across the focal plane array.

2. The system of claim 1, wherein the portion of the focal plane array comprises a plurality of pixels.

3. The system of claim 1, wherein the component of the thermal detector comprises a lens, and the sensor is configured to determine the presence of the lens by detecting a wavefront of radiation reflected by the lens.

4. The system of claim 3, wherein upon determining the presence of the lens, at least one vehicle of the plurality of unmanned aerial vehicles is configured to move in a direction substantially parallel to a plane defined by the lens.

5. The system of claim 1, wherein the plurality of unmanned aerial vehicles is configured to move in concert, in response to a signal from a remote source, from a location outside of a field of view of the focal plane array to a location within the field of view.

6. The system of claim 1, wherein each vehicle of the plurality of unmanned aerial vehicles includes a respective communicator, each vehicle of the plurality of unmanned aerial vehicles being in communication with at least one other vehicle of the plurality of unmanned aerial vehicles via the communicator.

7. The system of claim 1, wherein one of the beam emitter and at least one vehicle of the plurality of unmanned aerial vehicles includes an aiming device configured to rastor the respective beam of thermal radiation across the focal plane array while the at least one vehicle remains substantially stationary within a field of view of the focal plane array.

8. A method of interacting with a thermal detector comprising:

sensing the presence of a component of the thermal detector;

generating a signal indicative of the presence of the component; and moving a plurality of unmanned aerial vehicles in concert, relative to the thermal detector and within a field of view of a focal plane array of the detector while each of the plurality of unmanned aerial vehicles impinges a respective beam of thermal radiation upon a focal plane array of the thermal detector in response to the signal, thereby rendering a portion of the focal plane array inoperable;

wherein movement of each unmanned aerial vehicle within the field of view rastors each respective beam across the focal plane array.

9. The method of claim 8, wherein the portion of the focal plane array comprises a plurality of pixels.

10. The method of claim 8, wherein the component of the thermal detector comprises a lens, and the sensing of the component of the thermal detector comprises detecting a wavefront of radiation reflected by the lens and determining that the lens has been detected.

11. The method of claim 10, wherein upon determining the presence of the lens, at least one vehicle of the plurality of unmanned aerial vehicles is configured to move in a direction substantially parallel to a plane defined by the lens.

12. The method of claim 8, wherein the plurality of unmanned aerial vehicles is configured to move in concert, in response to a signal from the remote source, from a location outside of a field of view of the focal plane array to a location within the field of view.

13. The method of claim 8, wherein each vehicle of the plurality of unmanned aerial vehicles is in communication with at least one other vehicle of the plurality of unmanned aerial vehicles via the communicator.

14. The method of claim 8, further comprising moving the at least one unmanned aerial vehicle substantially parallel to a plane defined by the lens, thereby impinging the beam onto a plurality of pixels of the focal plane array.

15. The system of claim 8, wherein at least one vehicle of the plurality of unmanned aerial vehicles aims a respective beam in different directions to rastor a respective beam of thermal radiation across the focal plane array while the at least one vehicle remains substantially stationary within a field of view of the focal plane array.

\* \* \* \* \*